March 16, 1926.
E. T. BASTIS
WINDSHIELD
Filed Oct. 22, 1923
1,577,098
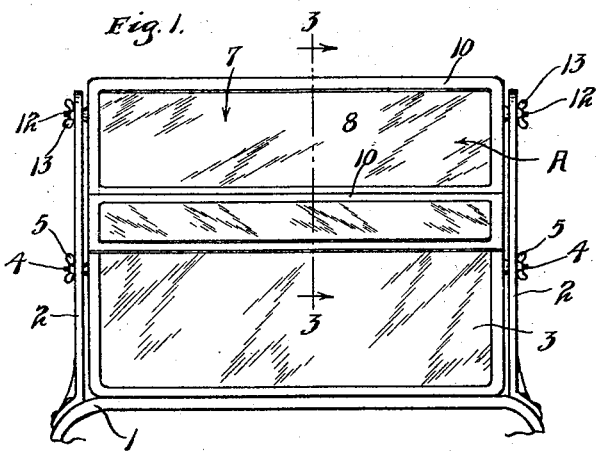
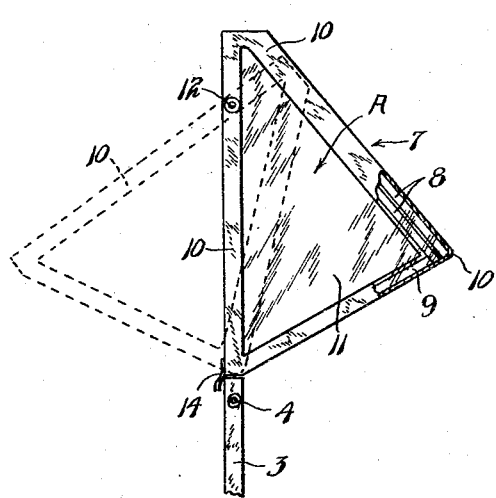
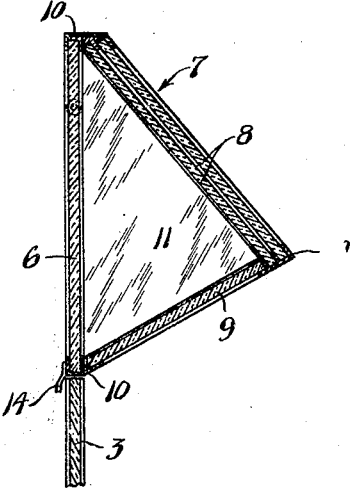
INVENTOR.
EMIL T. BASTIS.
BY HIS ATTORNEY.
James F. Williamson Patented Mar. 16, 1926.

1,577,098

UNITED STATES PATENT OFFICE.

EMIL T. BASTIS, OF MINNEAPOLIS, MINNESOTA.

WINDSHIELD.

Application filed October 22, 1923. Serial No. 670,024.

*To all whom it may concern:*

Be it known that I, EMIL T. BASTIS, a citizen of the United States, residing at Minneapolis, in the county of Hennepin and State of Minnesota, have invented certain new and useful Improvements in Windshields; and I do hereby declare the following to be a full, clear, and exact description of the invention, such as will enable others skilled in the art to which it appertains to make and use the same.

This invention relates to a vision shield for a vehicle, such as the ordinary wind shield now commonly used on automobiles. With the high power lights now used on automobiles it is well known that the driver is often blinded by the glare from the lights of an approaching car.

It is an object of this invention to provide a wind shield of simple and efficient construction which will eliminate the blinding effect from the glare of the lights of an approaching machine.

It is a further object of the invention to provide a wind shield comprising a laminated sheet of transparent material and also to provide a wind shield preferably in the shape of a prism It is also an object of the invention to provide such a wind shield which will afford a plain transparent surface for the driver to see through when it is raining or snowing.

It is a still further object of the invention to provide a wind shield, as above set forth, which is adjustable to various positions.

These and other objects and advantages of the invention will be fully set forth in the following description made in connection with the accompanying drawings in which like reference characters refer to the same parts throughout the different views, and in which,—

Fig. 1 is a view in front elevation of the device, as seen from the rear of the wind shield;

Fig. 2 is an end view of the wind shield showing a different position of the same in dotted lines; and Fig. 3 is a vertical section taken on the line 3—3 of Fig. 1, as indicated by the arrows in Figs. 2 and 3, but shown on an enlarged scale.

Referring to the drawings, a portion of the cowl of an automobile body is illustrated as 1, from the sides of which rise the standards 2 serving to support the wind shield. Said wind shield is shown as comprising a lower plane transparent section 3 which, if desired, may be swung about the axis of the pivots 4 and be clamped in position by the wing nuts 5.

In accordance with the present invention, an upper section of wind shield is provided comprising a transparent plate 6 preferably of glass, which normally, will occupy a substantially vertical position in line with the vertical position of the shield section 3. The plate 6 has extending inwardly and downwardly from its upper edge a laminated transparent sheet 7 formed of a plurality of sheets 8 of glass or other suitable transparent material arranged slightly spaced and in parallel relation. Another plate of glass or other transparent material 9 extends from the lower inner edge of the sheet 7 and adjacent the lower edge of the plate 6. The plates 6 and 9 and the laminated sheet 7 are held in rigid relation in a suitable metallic frame 10 which extends about the edges of the glass plates and over the outer sides of the end plates of glass or transparent material 11, which plates 11 extend across the ends of the plates 6, 8 and 9, and are illustrated as parallel to each other. Plates 6 and 9 and the sheet 7 thus form a hollow prism with transparent sides. The shield comprising members 6, 7, 9, 10 and 11, is designated generally as A and the same is rotatable about a horizontal axis which is the axis of pivot members 12 extending through the standards 2 and said shield A is held in any desired adjusted position by the wing nuts 13. The frame 10, at the lower outer edge of plate 6 has a downwardly and outwardly extending narrow strip 14 thereon adapted to form a water shed from which the water running down the plate 6 will drip.

With the shield section A in position shown in Figs. 2 and 3, the driver will look through the laminated sheet 7 and the plate 6 in the usual manner. If a machine approaches with bright lights, the rays from said lights will pass through the vertical section 6 and will strike successively the inner surfaces of plates 8. The plates 8 will be of highly polished material and a considerable portion of the rays will be reflected downwardly by the inner surfaces of the plates 8. Only a portion of the light, therefore, from the approaching machine will pass through the laminated sheet 7 so that the glare from said lights will be eliminated and the light will effectively be dimmed. A sufficient number of plates 8 will be used to give the desired dimming effect, only two of the plates being shown in the embodiment of the invention illustrated. The direction in which the rays from the approaching machine will be reflected from the inner surfaces of plates 8 will, of course, vary with the position of said plates and said rays can be made to be reflected downwardly onto the road ahead of the machine or any other direction by adjusting the section A on the pivot members 12. It will be noted that when the said section A is in the position shown in dotted lines in Fig. 2, the plate 9 is below the plate 6. If it be raining, the water will strike against the plate 6 and run down the same and drip off of the strip 14. The plate 9 will, therefore, be kept clean so that the driver will have a clean transparent surface through which to observe the road. The section A can be swung further outward than shown by the dotted lines in Fig. 2 so as to give a free open space for the driver's vision, as is done with the swinging top section of the ordinary wind shield. The laminated sheet 7 does not in any way interfere with the driver's vision.

From the above description it is seen that applicant has provided a simple and efficient structure of adjustable wind shield having many advantages. The shield absolutely eliminates the objectionable glare from approaching lights or from the sun when the latter is near the horizon. The device possesses all the advantages of the ordinary plain adjustable wind shield section and, furthermore, as above described, furnishes a clean and clear driver's shield in the rain or snow. The device can be easily made and installed, either on cars already built or when the same are originally erected. The device has been demonstrated in actual practice and found to be very successful and efficient for the purpose intended.

It will, of course, be understood, that various changes may be made in the form, details, arrangement and proportions of the parts without departing from the scope of applicant's invention, which, generally stated, consists in a device capable of carrying out the objects above stated, such as shown and described and set forth in the appended claims.

What is claimed is:

1. A vision shield for an automobile comprising a triangular prism having a transparent front side normally disposed in a vertical plane, a rear transparent laminated side normally extending at an acute angle downwardly from said vertical side, and a bottom transparent side extending substantially normally to said rear side, said prism being rotatable about an axis parallel to one longitudinal edge and disposed substantially in the front side.

2. A vision wind shield for an automobile comprising a member formed of a plurality of flat slightly spaced substantially parallel transparent sheets inclined at a considerable angle to the horizontal.

3. A vision shield for a vehicle comprising a transparent plate and a plurality of slightly spaced substantially parallel transparent sheets extending at an inclination to the plane of said plate.

4. A vision shield for a vehicle comprising a hollow prism having transparent sides and its longitudinal axis extending substantially transversely of the longitudinal center line of said vehicle, one of the sides of said prism being formed of a plurality of slightly spaced transparent sheets.

5. A shield for a vehicle comprising a transparent plate normally disposed substantially in a vertical plane and a member comprising a plurality of spaced substantially parallel transparent plates extending inwardly and angularly therefrom and in fixed relation thereto.

6. A wind shield for a vehicle having a lower plane section normally in vertical position and an upper section revoluble about a horizontal axis comprising a normally vertical transparent plate, a laminated transparent sheet extending rearwardly and downwardly from adjacent the top of said plate and a transparent plate extending outwardly and downwardly from the lower edge of said sheet to the lower edge of said first mentioned plate, said plates and sheet being held in rigid relation.

7. The structure set forth in claim 6, and triangular parallel plates extending across the ends of said plates and sheet.

In testimony whereof I affix my signature.

EMIL T. BASTIS.